(12) United States Patent
Periquet et al.

(10) Patent No.: US 8,493,190 B2
(45) Date of Patent: Jul. 23, 2013

(54) HAPTIC INTERFACE WITH INCREASED BRAKING FORCE

(75) Inventors: Florian Periquet, Laxou (FR); Samuel Roselier, Le Rheu (FR); Jose Lozada, Massy (FR); Moustapha Hafez, Arcueil (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 428 days.

(21) Appl. No.: 12/989,714

(22) PCT Filed: Apr. 27, 2009

(86) PCT No.: PCT/EP2009/055040
§ 371 (c)(1),
(2), (4) Date: Oct. 26, 2010

(87) PCT Pub. No.: WO2009/133057
PCT Pub. Date: Nov. 5, 2009

(65) Prior Publication Data
US 2011/0128135 A1 Jun. 2, 2011

(30) Foreign Application Priority Data

Apr. 29, 2008 (FR) ...................................... 08 52898

(51) Int. Cl.
*G08B 6/00* (2006.01)
*G09G 5/00* (2006.01)
(52) U.S. Cl.
USPC ..................... 340/407.2; 340/407.1; 345/156

(58) Field of Classification Search
USPC .......... 340/407.2, 573.1, 407.1, 686.1, 691.1, 340/693.5; 434/45; 345/156, 157, 158, 161, 345/163, 167, 168, 184; 463/38, 37; 188/1.11 E, 188/164, 161; 200/6 A, 5 R, 176–178
See application file for complete search history.

(56) References Cited

U.S. PATENT DOCUMENTS

| | | | |
|---|---|---|---|
| 5,090,531 A | | 2/1992 | Carlson |
| 6,373,465 B2 * | | 4/2002 | Jolly et al. ..................... 345/156 |
| 7,061,466 B1 * | | 6/2006 | Moore et al. .................. 345/156 |
| 7,242,390 B2 * | | 7/2007 | Bader et al. ................... 345/161 |
| 7,764,268 B2 * | | 7/2010 | Gomez et al. ................. 345/156 |
| 2001/0041637 A1 | | 11/2001 | Leeper |

(Continued)

FOREIGN PATENT DOCUMENTS

| DE | 10 2004 041 6 | 3/2005 |
|---|---|---|
| DE | 10 2005 060 933 B3 | 6/2007 |

(Continued)

OTHER PUBLICATIONS

U.S. Appl. No. 12/990,083, filed Oct. 28, 2010, Periquet et al.

(Continued)

*Primary Examiner* — Anh V La
(74) *Attorney, Agent, or Firm* — Oblon, Spivak, McClelland, Maier & Neustadt, L.L.P.

(57) ABSTRACT

A haptic interface including an element that interacts with a user; a rotation shaft with a longitudinal axis to which the user interaction element is fixed in rotation; a fluid interaction element, the fluid interaction element being fixed in rotation to the shaft, the fluid being of magneto-rheological type, a system generating magnetic field in the fluid; and a control unit capable of generating orders to magnetic field generation system so as to modify the magnetic field. The interaction element includes a cylindrical wall of revolution with a longitudinal axis, including through openings and/or patterns in relief.

26 Claims, 7 Drawing Sheets

U.S. PATENT DOCUMENTS

2002/0057152 A1 5/2002 Elferich et al.
2007/0013215 A1 1/2007 Browne et al.
2007/0176035 A1 8/2007 Campbell
2010/0031803 A1 2/2010 Lozada et al.

FOREIGN PATENT DOCUMENTS

| DE | 10 2006 012 807 A1 | 9/2007 |
|---|---|---|
| EP | 1 168 622 A2 | 1/2002 |
| JP | 2002-189559 | 7/2002 |
| WO | WO 2005/073833 A1 | 8/2005 |

OTHER PUBLICATIONS

French Preliminary Search Report issued Nov. 26, 2008 in FR 0852898 (with Translation of Category of Cited Documents).

* cited by examiner

HAPTIC INTERFACE WITH INCREASED BRAKING FORCE

TECHNICAL FIELD AND PRIOR ART

The present invention relates to sensorial interfaces providing the user with force feedback, used particularly in the field of haptic devices and in the fields of virtual reality and the automobile.

This type of haptic interface may for example be used in automobile vehicles, forming an onboard haptic interface to assist the car driver. This interface is in the form of a knob with a force feedback, so that the user can interact with various vehicle equipment or accessories such as the GPS (Global Positioning System), radio, air conditioning, etc.

Such a knob is actually used in top-of-the-range automobiles.

This knob has no sensorial force feedback. The resistance felt by the user to change from one notch to the next is invariable and is predefined during the design of the knob. Thus, the intensity of the force feedback is constant, and is independent of the speed of manipulation of the knob or the required control type.

The resistance applied by the knob is obtained by means of a DC motor associated with reduction gears. Firstly, this type of resistance generator does not provide much sensitivity in the force felt by the user. Secondly, its size and mass are not negligible. This limits its applications in onboard systems.

Haptic interfaces also exist in which the force feedback is obtained using a magneto-rheological fluid. By applying a magnetic field to this fluid, the apparent viscosity of the fluid increases so that a braking force can be applied to an element fixed to the knob and immersed in this fluid. Such interfaces are described in document US 2002/0057152. However, in the case of an application in an onboard system, existing interfaces in known structures cannot produce an attractive compromise between their size, the resistive torque produced by the knob and the electrical consumption to generate the magnetic field in the magneto-rheological fluid.

Consequently, one of the purposes of the present invention is to provide a haptic interface with force feedback capable of providing high damping forces, while remaining compact.

Another purpose of the present invention is to offer a haptic interface with a force feedback providing an interactive easy-to-use, intuitive and high performance tool.

PRESENTATION OF THE INVENTION

The purposes mentioned above are achieved by a haptic interface in which the resistance to the movement of a knob manipulated by a user is obtained by an element interacting with a magneto-rheological fluid, the modification of the apparent viscosity of this fluid being obtained by means of a magnetic circuit, the element interacting with the fluid having a cylindrical wall of revolution free to rotate about its axis, in which through drillings and/or ribs are formed in order to increase the resistance to displacement in the magneto-rheological fluid when its viscosity is increased by the application of a magnetic field.

In other words, the interaction element is not smooth but it comprises projecting or recessed relief and/or drillings. Thus, when a magnetic field is applied, the magnetic particle chains contained in the magneto-rheological fluid forming during application of a magnetic field are located at the relief and form obstacles to displacement of the relief, shear forces being applied to the particle chains by the interaction element.

Thus, the device offers increased damping in a smaller volume.

For example, a high resistance can be generated with the present invention while keeping a no load force at tolerable levels. The use of a rotary brake based on a magneto-rheological fluid increases the ratio between the maximum resisting force and the minimum passive force. The controllability of the system is significantly increased.

Furthermore, with the invention, a higher braking force is obtained for the same magnetic field. Therefore, the same actuation range can be kept exactly as with existing interfaces but with a lower electrical consumption or with a larger actuation range.

In one advantageous embodiment of the present invention, the system for generating a magnetic field comprises a permanent magnet combined with a system for generating a variable magnetic field. Thus, the user feels mechanical resistance even when there is no electrical power supply. The magnetic field created by the permanent magnet can also possibly be cancelled or reinforced using the variable magnetic field generation system, that can be used to create a wide range of resistive torques adaptable to each type of interface actuation, unlike existing interfaces with electrical motors for which force feedback values are fixed.

For example, the magnetic field generated by the magnet may be sufficient so that the apparent viscosity of the fluid is such that the knob is prevented from all movement, thus locking the interface in the lack of any current. The interface is unlocked by the application of a magnetic field opposing the above-mentioned field using the system to generate a variable magnetic field. Unlike existing interfaces, this avoids the need to provide a permanent power supply to the magnetic field generation system to block the knob, or the need for a complex mechanism to lock and unlock the knob that would make use of the interface less easy and less intuitive.

This wide range of resistive torques is also obtained with a low electrical consumption, because some or all of the magnetic field required to produce the maximum resisting force is generated without any electrical consumption by the permanent magnet, while limiting the size.

In the case of a magnetic system comprising a permanent magnet, the electrical power is used to generate either a magnetic field that is additive to the magnetic field of the magnet thus increasing the amplitude of the perceived torque, or to generate a magnetic field opposing the magnetic field of the magnet, which cancels the effect of the magnet. The usage range is doubled for a given electrical power.

Therefore, the haptic interface developed enables semi-active control of the force on the knob to generate different sensations, by means of a magneto-rheological fluid while being smaller in size and having lower electrical consumption. A "semi-active system" means a system providing a compromise between an "active" system and a "passive" system. It can be controlled in real time but energy cannot be injected into the controlled system. It controls the haptic feedback perceived by the user by reaction by absorbing/dissipating energy according to a predefined control law.

In one particularly advantageous embodiment, the means of generating a magnetic field generate a field in the radial direction from the cylindrical wall of the interaction element.

The subject-matter of the present invention is then mainly a haptic interface comprising an element that interacts with a user, a rotation shaft with a longitudinal axis to which said user interaction element is fixed in rotation, an element that interacts with a fluid, said fluid interaction element being fixed in rotation to said shaft, said fluid being of magneto-rheological type, a system for generating a magnetic field in said fluid, and a control unit capable of generating orders to said magnetic field generation system so as to modify the magnetic field, said interaction element comprising at least one cylindrical wall with a longitudinal axis in which through openings are formed and/or on which patterns are formed in relief.

Advantageously, the openings and/or relief patterns extend along the longitudinal axis, further increasing the damping force.

In one example embodiment, the fluid interaction element comprises several concentric sidewalls at a spacing from each other and fixed to the head, which increases the interaction area with the fluid while limiting the total size.

Particularly advantageously, the cylindrical wall of the interaction element is made of a non-magnetic material, which reduces rotation guide stresses on the interaction element.

The magnetic field generation system is advantageously capable of generating a radial magnetic field, this field causes chains orthogonal to the wall of the interaction element, which further increases the damping forces.

The haptic interface according to the invention may comprise at least one angular position, angular velocity and/or angular acceleration sensor for said shaft, said control unit generating orders as a function of information provided by said at least one position, velocity and/or angular acceleration sensor.

The control unit can also generate orders to the magnetic field generation system at given time intervals that may be fixed or variable depending on the usage mode.

In one advantageous embodiment, the magnetic field generation system comprises means of generating a variable magnetic field and means of generating a permanent magnetic field, so that a wider usage range can be obtained for the same electrical consumption.

For example, the means of generating a permanent magnetic field comprise at least one permanent magnet, and the means of generating a variable magnetic field comprise at least one electromagnetic coil.

In one variant embodiment, the means of generating a permanent magnetic field are arranged inside the fluid interaction element and are immobile relative to it, and the means of generating a variable magnetic field are arranged inside the fluid interaction element and are immobile relative to it. The coil can then surround the permanent magnet.

In one variant, the permanent magnet may comprise at least one sleeve surrounding the coil.

In another variant, the means of generating a permanent magnetic field are arranged between two concentric sidewalls of the interaction element, and are immobile relative to them.

In yet another variant, the means of generating a permanent magnetic field are fixed on the fluid interaction element and the means of generating a variable magnetic field are immobile relative to it, said means of generating a permanent magnetic field being perforated by openings in line with the opening interaction element.

The means of generating a variable magnetic field can also be arranged inside the interaction element and immobile relative to it.

In another example embodiment, the shaft passes through the system for generating the magnetic field.

The angular position, angular velocity or angular acceleration sensor may for example be provided at one longitudinal end of the shaft and may comprise a part fixed to the shaft in rotation and a part immobile with respect to the axis. The part fixed to the shaft may then be an optical wheel and the immobile part may be an optical fork.

Advantageously, the interface according to the invention comprises a rod passing through the shaft from one side to the other, said rod can move longitudinally, and a device for detecting displacement of said rod.

The interface may also comprise a thermal device capable of modifying the temperature of the user interaction element, the thermal device comprising at least one Peltier cell and/or a device capable of vibrating the user interaction element.

The subject-matter of the present invention is also a haptic assembly comprising a frame and the interface according to the present invention mounted on this frame, said interface being free to move along the axis of the shaft.

The interface may be free to move in translation along at least one direction orthogonal to the longitudinal axis and/or is free to rotate about at least one direction orthogonal to the longitudinal axis.

The haptic assembly according to the invention may comprise force feedback devices to oppose resistance during a movement along at least one axis orthogonal to or about the longitudinal axis.

BRIEF DESCRIPTION OF THE DRAWINGS

The present invention will be better understood after reading the description given below and the appended drawings in which.

DETAILED PRESENTATION OF PARTICULAR EMBODIMENTS

We will now describe details of example embodiments of the haptic interface according to the present invention.

The haptic interface has at least one degree of rotation about an X axis generally forming an axis of revolution for the interface.

Figure 1A:
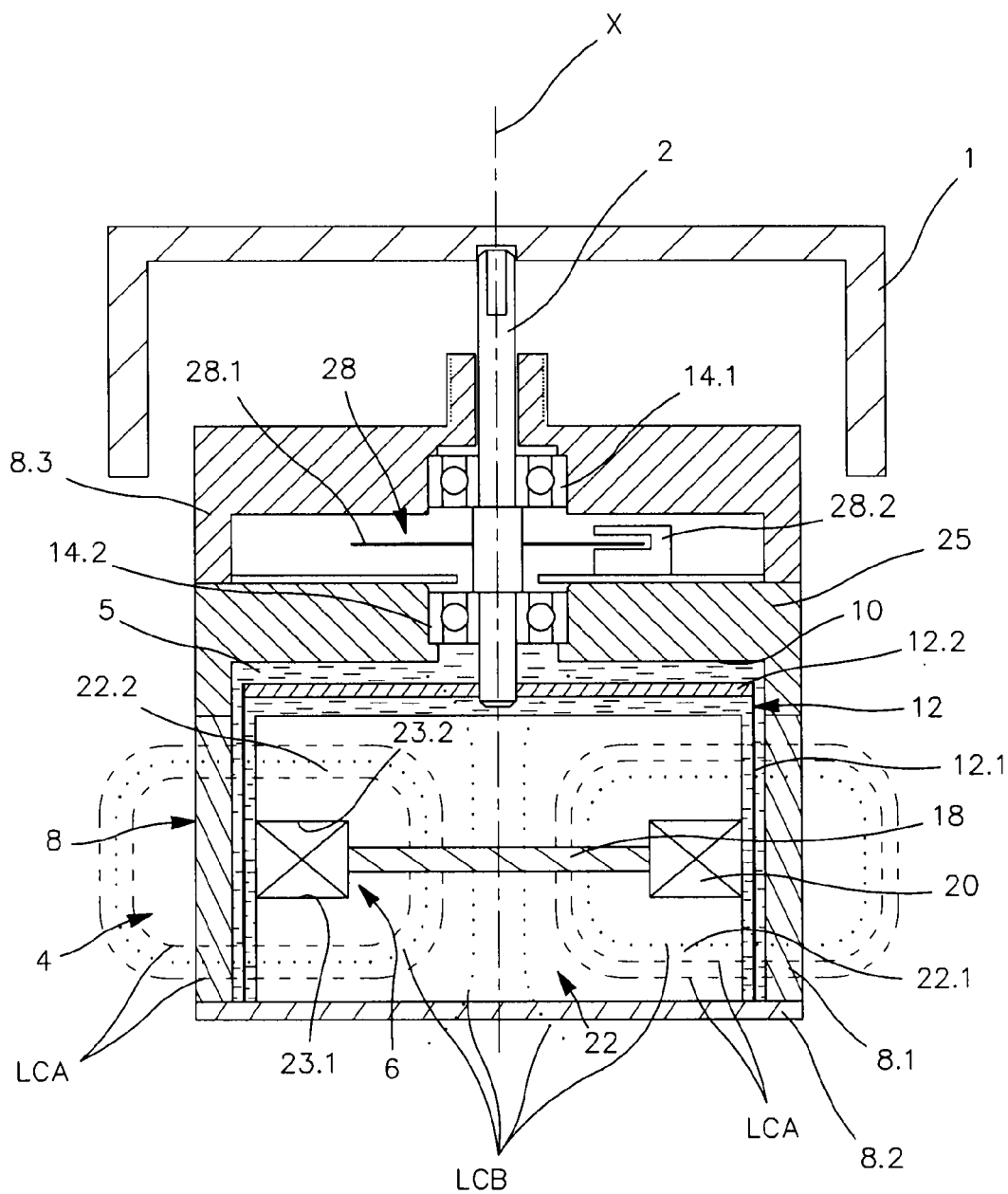
FIG. 1A is a longitudinal diagrammatic sectional view of a first example embodiment of a haptic interface according to the present invention.
Figure 1B:
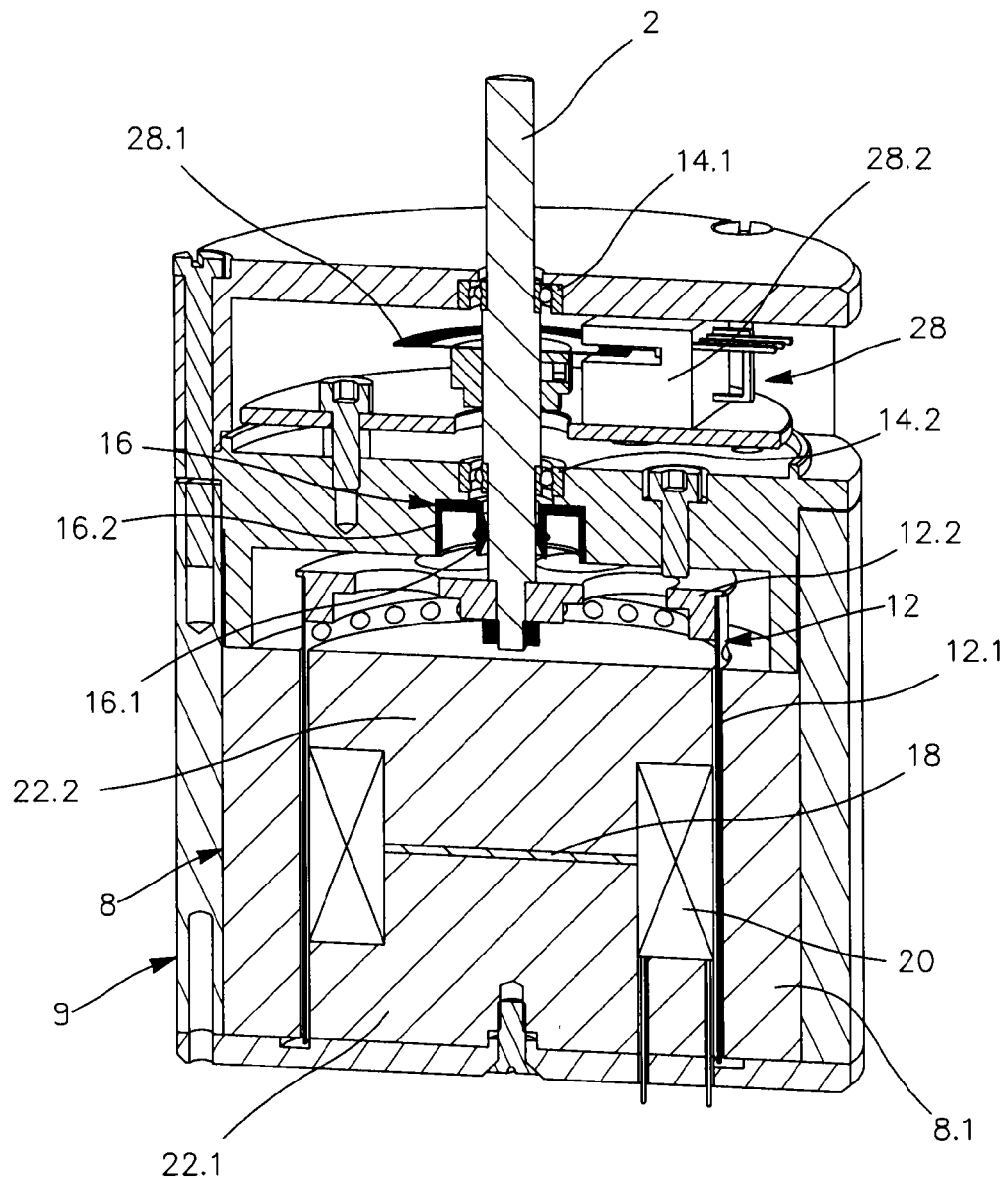
FIG. 1B is a perspective longitudinal sectional view of an industrial embodiment of the interface in FIG. 1A, FIGS. 1C and 1D are partial perspective diagrammatic views of an interaction element according to the present invention.

FIGS. 1A and 1B show a first example embodiment of an interface according to the invention comprising an element 1 that will be manipulated by a user and that will be called a "knob" in the following, this knob is fixed in rotation to a shaft 2 free to move in rotation about the X axis, and a device for generating a resisting force 4 opposing rotation of the shaft 2.

The device 4 comprises a fluid for which the characteristics can be modified by means of a magnetic field and a system for generating a magnetic field 6 that fits in a housing 8. The fluid may for example be a magneto-rheological liquid 5.

The housing 8 is cylindrical in shape formed by a sidewall 8.1, a bottom head 8.2 and a top head 8.3.

The shaft 2 passes through the top head 8.3 and penetrates inside the housing 8.

The housing 8 delimits a sealed chamber 10 confining the magneto-rheological fluid 5, all or part of this chamber being subjected to a magnetic field generated by the system 6.

The device 4 also comprises an element 12 fixed in rotation to shaft 2 and housed in the leak tight chamber 10. This element can interact with the magneto-rheological fluid 5, rotation of the element 12 being more or less slowed by the magneto-rheological fluid 5 depending on its apparent viscosity.

In the example shown, the element 12 is cylindrical and bell-shaped and has a circular-cross section formed from a sidewall 12.1 and a head 12.2. The shape of the sealed chamber corresponds to the shape of the bell 12, which reduces the required quantity of fluid. A longitudinal section through the element 12 interacting with the fluid is in the form of an inverted U.

The head 12.2 is fixed on the end of the shaft 2 penetrating into the sealed chamber 10 and the chamber 10.

The sidewall 12.1 of the element 12 may be a magnetic or non-magnetic material. Advantageously, the sidewall 12.1 is made from a non-magnetic material, which can reduce guide stresses for rotation of element 12. Due to the magnetic material, there is no magnetic attraction between the poles and the sidewall 12.1, consequently the element 12 is not attracted by the magnets. Guidance of element 12 in rotation may be simplified, there is no need to use voluminous guide means.

The use of an element intended to interact with the variable viscosity fluid composed of a non-magnetic material and comprising openings and/or relief can give braking forces equivalent to what can be obtained with a magnetic part, while significantly simplifying the adjacent mechanical structure, particularly the means used for guidance.

Figure 1C:
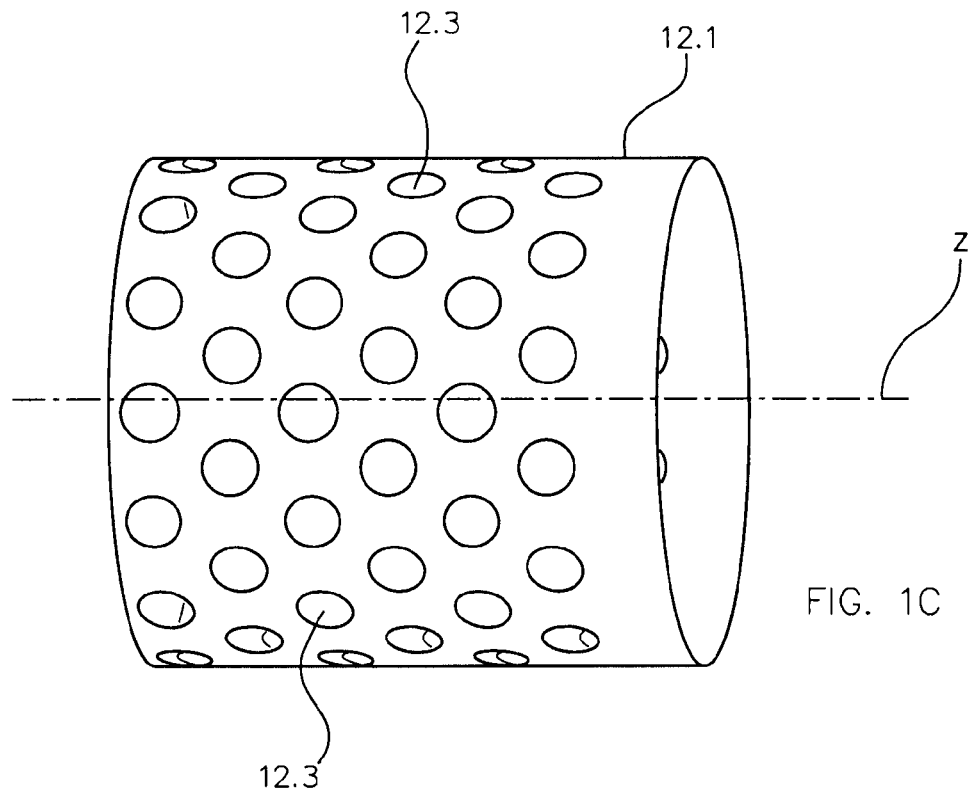
Figure 1D:
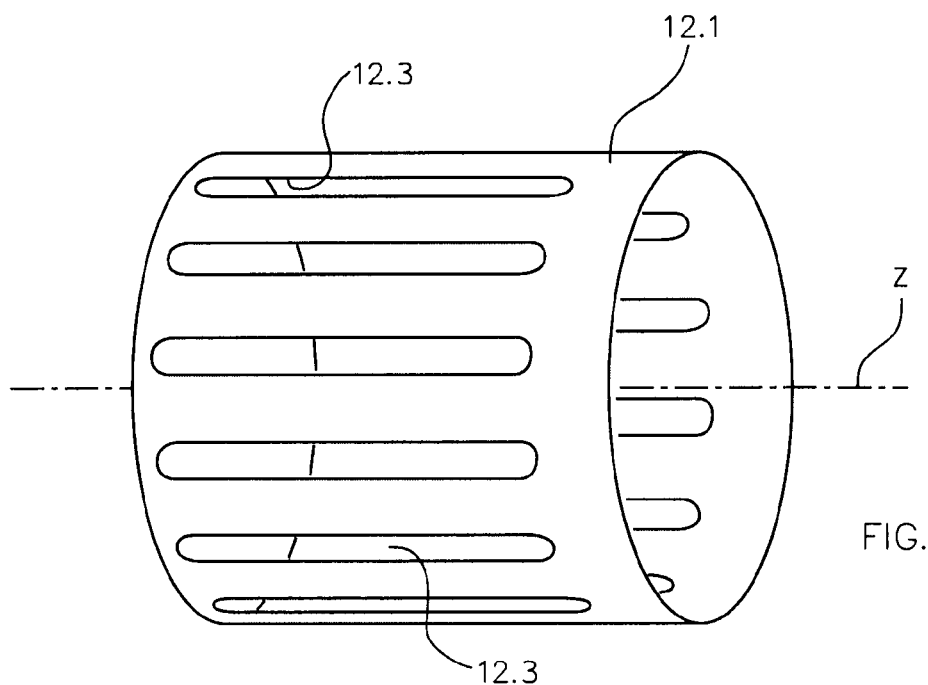

According to the present invention, the sidewall 12.1 is provided with patterns 12.3; in FIGS. 1C and 1D, these patterns are cut out in advance. For example, these patterns 12.1 may be circular shaped openings (FIG. 1C) or openings in the form of longitudinal grooves (FIG. 1D).

Openings of any other shape could be provided, for example square openings or openings inclined from the axis of the bell. These patterns can increase the braking capacity of element 12 and thus the torque perceived by the user.

It would also be possible to provide patterns in relief, for example in the form of longitudinal ribs.

It would also be possible to make an interaction element comprising both openings and relief at the same time.

In the example shown, the sealed chamber 10 is completely full of magneto-rheological fluid 5. Therefore the bell 12 is completely immersed in the magneto-rheological fluid 5. More particularly, the inner and outer faces of the wall 12.1 are in contact with the magneto-rheological fluid 5. But it would also be possible that only the sidewall 12.1 is immersed in the magneto-rheological fluid 5

The shaft 2 is supported by bearings 14.1, 14.2 isolated from the magneto-rheological fluid 5 in a sealed manner. A sealing element 16 visible in FIG. 1B is provided between the sealed chamber 10 and the zone containing the bearings 14.1, 14.2. The sealing means surrounds the rotation shaft 2, which comprises an inner lip 16.1 surrounding the rotation shaft 2 and providing a dynamic seal and an outer lip 16.2 in static contact with the housing.

Leak tightness may be achieved by any other type of seal, conventional or other, for example such a ferrofluid held in place by means of a permanent magnet.

The magnetic field generation system 6 is capable of generating a variable magnetic field so as to vary the apparent viscosity of the magneto-rheological fluid 5.

In one particularly advantageous example, the system 6 comprises a means 18 of generating a permanent magnetic field in the absence of an electrical power supply, for example a permanent magnet, and a means 20 capable of generating a variable magnetic field.

For reasons of simplicity, the permanent magnetisation means 18 will be referred to as a permanent magnet, but any other device offering such a magnetisation is within the scope of the present invention.

In the example shown, the magnet is formed from a disk arranged inside the bell 12.

The means of generating a variable magnetic field 20 is for example formed by at least one coil placed inside the bell 12 and surrounding the permanent magnet 20. The coil(s) has (have) an axis coincident with the longitudinal X axis.

Furthermore, the system 6 comprises a magnetic circuit to guide the magnetic field such that the field lines pass through the sidewall 12.1 of the bell 12 and close inside the sidewall 8.1, such that the chains of magnetic particles contained in the magneto-rheological fluid 5 pass through the sidewall 12.1. In general manner, the permanent magnet 18 and the coil 20 are capable of generating a magnetic field for which the field lines pass through the fluid and close on the magnet and the coil.

Advantageously, the magnetic field generation system is such that it generates field lines orthogonal to the wall 12.1 along part of their path, which causes the appearance of chains orthogonal to the wall 12.1, further increasing the force necessary to shear the chains.

The magnetic circuit comprises a part 22 made of a material capable of conducting the magnetic field forming a core located inside the bell and inside which the permanent magnet 18 and the coil 20 are located.

In the example shown, the core 22 in the form of a regular cylinder comprises a lower part 22.1 and an upper part 22.2, the magnet and the coil being sandwiched between the two parts 22.1, 22.2. The magnet and the two parts 22.1 and 22.2 are fixed to each other.

The chamber 10 is delimited firstly by the outer faces of the core 22, the outer sidewall 8.1 and an upper separation wall 25 through which the rotation shaft 2 passes.

In particular, in the example shown, the parts 22.1 and 22.2 each comprise a shoulder 23.1, 23.2 defined between a larger diameter part and a smaller diameter part, the magnet 18 is placed between the free ends of the smaller diameter parts and the coil 20 is mounted around the smaller diameter parts bearing on the shoulders 23.1, 23.2 through its two axial ends.

The magnetic circuit also comprises the outer wall 8.1 of the housing 8, forming the outer wall of the sealed chamber 10.

It would be possible for only the inner part of the outer wall 8.1 to be made of a magnetic material and not the entire wall 8.1, which would further confine the magnetic field.

The magnetic circuit fits into an envelope 9, forming the outside envelope of the haptic device.

When the sidewall 12.1 is made from a magnetic material, the magnetic circuit is also formed by the sidewall 12.1 of the bell 12.

The magnet field lines LCA pass through the upper part 22.1 of the core, then the chamber 10 through the sidewall 12.1 of the bell 12, the outer sidewall 8.1 of the housing 8, the lower part 22.2 of the core 22 and close on the magnet 18.

The field lines LCB of the coil 20 follow the same magnetic circuit as the magnetic field lines LCA of the permanent magnet 18.

This architecture according to the present invention ensures a very good guidance of the magnetic field of the magnet 18 and the coil 20.

Thus, the direction and intensity of the current circulating in the coil 20 can be controlled to amplify or reduce or even cancel out the magnetic field generated by the magnet 18.

The central core 22 and the wall 8.1 form a stator, while bell 12 that turns around the X axis forms a rotor.

The upper part of the housing in which the bearings 14.2, 14.2, the shaft and the head of the bell 12.2 are made from a non-magnetic material, and the bottom head 8.2 of the housing is also made of a non-magnetic material to prevent the dispersion of field lines.

Means 28 are also provided to measure the angular position and/or the angular velocity and/or the angular acceleration of the bell 12 and therefore of the knob 1. For example, these means are placed between the two bearings 14.1, 14.2 and are formed by an optical encoder type rotation sensor formed by an encoder wheel 28.1 fixed in rotation with the shaft 2 and an optical fork 28.2 fixed on the housing.

Any sensor capable of providing a logical or analogue image of the position, the velocity and/or the acceleration of the bell 12 is within the scope of the present invention.

The sensor 28 is connected to a control unit (not shown) to which it transmits its measurements.

The coil 20 is connected to a source of electrical current (not shown) controlled by the control unit so as to vary the intensity and the direction of the current in the coil as a function of the position of the bell 12 and therefore the position of the knob 1, measured by the sensor 28.

We will now explain the operation of this haptic interface according to the present invention, in the particular example shown in FIGS. 1A and 1B.

When the user manipulates the knob 1, particularly when he pivots it in one direction or another about the X axis, the rotation sensor 28 detects rotation of the shaft 2 and transmits this information and the measurement of the displacement, velocity and/or angular acceleration of the shaft 2, and therefore of the bell 12, to the control unit.

As a function of the information received, the control unit generates an order to the electrical power supply to send a current with a given intensity in a given direction as a function of pre-recorded models or as a function of a communication with an external system (for example such as the GPS system in an automobile), to the coil 20.

This current may be zero if the control unit decides that the magnetic field generated by the permanent magnet 18 is sufficient to modify the apparent viscosity of the fluid 5 to generate sufficient resisting forces on the bell 12.

This current may be such that it increases the magnetic field, therefore the apparent viscosity of the fluid and consequently resisting forces on the bell 12.

This current may be such that the coil 20 generates a magnetic field in the direction opposite to the direction of the magnetic field produced by the permanent magnet 18, the addition of the two fields then gives a resultant magnetic field with reduced intensity relative to the intensity of the field produced by the permanent magnet 18 alone, or even zero intensity.

The characteristics of the current sent to the coil may also depend on the speed at which the knob 1 is turned. The sensor may be an angular displacement, angular velocity or angular acceleration sensor. Information about the movement is processed by the control device so as to define the set value to be sent to the power device.

This current causes the appearance of a magnetic field that is superposed on the magnetic field of the permanent magnet and is then applied to the magneto-rheological fluid, the magnetic particles contained in the fluid are then aligned along the field lines of the magnetic field forming chains. These chains are stronger when the magnetic field is strong. These chains of magnetic particles pass through the openings in the bell and oppose rotation of the bell, therefore they increase the shear forces necessary to displace the bell in the fluid and therefore to displace the knob. The field lines are advantageously radial when they pass through the chamber full of fluid, therefore the chains formed are approximately orthogonal to the surface of the sidewall of the bell and are therefore more efficient in acting as a brake to displacement of the bell.

In the case of patterns formed from relief, the patterns form obstacles to rotation of the bell, also increasing the force necessary to displace the bell.

In the advantageous example embodiment in which the magnetic field generation system comprises a permanent magnet and at least one coil, a resisting force can be generated even when there is no current. Thus, by choosing the permanent magnet (and more particularly the magnetic field that it generates) such that it modifies the apparent viscosity of the fluid so that the resisting forces on the bell fix the knob in rotation, the interface can be locked without consuming any electricity.

Furthermore, high magnetic field values can be achieved by coupling a permanent magnet and a coil, and therefore high resistive torques can be applied to the bell while limiting the size of the interface and the required electrical power.

Figure 2:
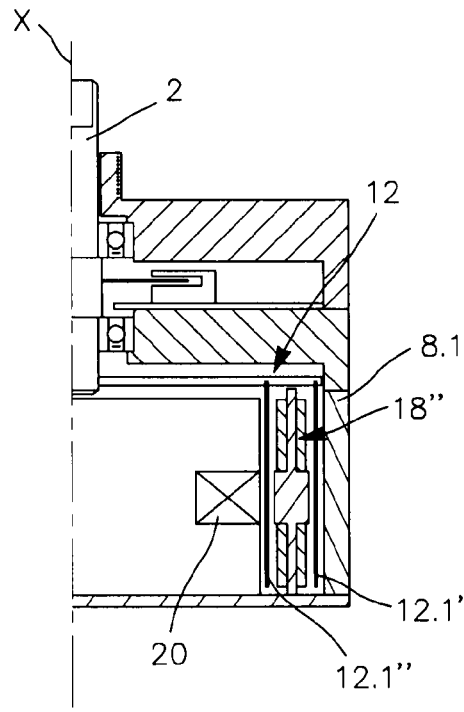
FIG. 2 is a half-longitudinal sectional view of a second variant embodiment of the interface in FIGS. 1A and 1B.

FIG. 2 shows a variant embodiment of the interface according to the invention in which the bell is doubled up so as to increase the interaction surface area with the fluid.

In the example shown, the bell 12 comprises concentric cylindrical outer and inner sidewalls 12.1' and 12.1" fixed to the head 12.2 and at a spacing from each other to enable the fluid to penetrate between the two walls.

According to the present invention, the walls 12.1' and 12.1" contain openings similar to those shown in FIGS. 1C and 1D and/or patterns in relief.

The fluid is located on each side of the two concentric walls and passes through them, the shear surface of the fluid is approximately twice that shown on the interface in FIGS. 1A and 1B. Obviously, it would be possible to provide more than two concentric walls and in particular their number depends on the maximum required size.

In the example shown, the permanent magnet 18" is placed between the two walls 12.1' and 12.1" and is fixed to the bottom head 8.2 of the housing 8 and forms a sleeve inserted between the two walls 12.1' and 12.1" of the bell.

A bell with a skirt formed from several concentric walls could also be used in a structure identical to that in FIGS. 1A and 1B.

Figure 3:
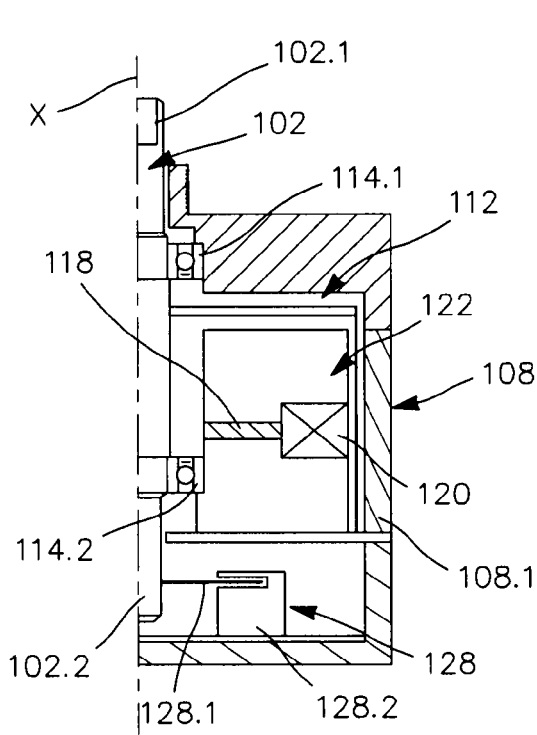
FIG. 3 is a half-longitudinal sectional view of a second example embodiment of a haptic interface according to the present invention, in which the knob rotation shaft passes through the internal stator.

FIG. 3 shows another example embodiment of an interface according to the present invention, this interface is different from that described above in that the rotation shaft passes through the stator, and more particularly the magnetic field generation system.

The references used to describe this example embodiment will be the same as those used for the description of FIGS. 1A and 1B plus 100.

The interface comprises a shaft 102 with a longitudinal X axis to which the knob that will be manipulated by the user is fixed at a first end 102.1.

The shaft 102 is fixed free to rotate in a housing 108 using bearings 114.1 and 114.2.

The housing 108 forms a stator and the shaft 102 forms a rotor to which a bell 112 is fixed in rotation and is immersed in a fluid with viscosity properties that are variable with the magnetic field.

Unlike the example in FIGS. 1A and 1B, the shaft passes through the central core from one side to the other.

The position, velocity or acceleration sensor 128 in this representation is located at a lower end of the shaft 102.2 opposite the end to which the knob is fixed (not shown). The knob is of the same type as described above, and for example comprises an encoder wheel 128.1 and an optical fork 128.2. The sensor is isolated from the fluid at the bearing 114.2.

The magnetic circuit shown is similar to that in the example in FIGS. 1A and 1B, it comprises a permanent magnet 118 in the form of a ring at the centre of the core and a coil 120.

The sidewall 108.1 of the housing and the core 122 are made from a magnetic material.

This interface operates in exactly the same way as that in FIGS. 1A and 1B and it will not be described again.

Figure 4:
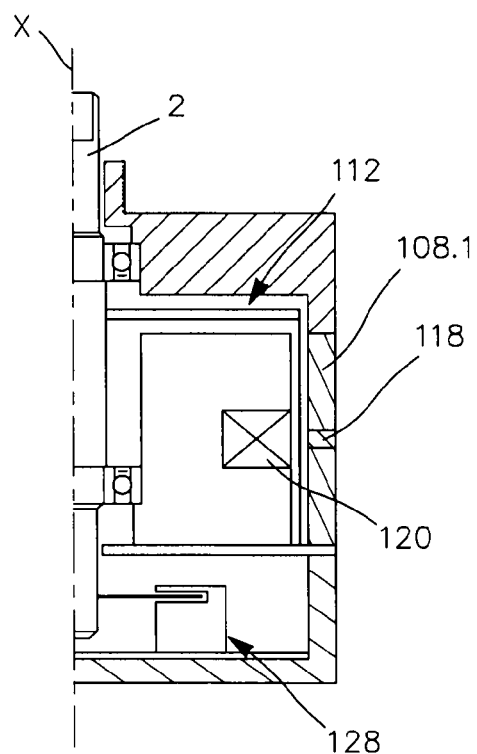
FIGS. 4 to 7 are half-longitudinal sectional views of variant embodiments of the interface in FIG. 3 in which the knob rotation shaft passes through the internal stator.

FIG. 4 shows a variant embodiment of the second example embodiment of the interface in which the permanent magnet 118 is no longer placed in the core inside the bell 112 but instead is in the sidewall 108.1 of the housing. In this configuration, the magnet is in the form of a ring radially in line with the coil 120. The sidewall 108.1 is made from a material capable of conducting a magnetic field.

Figure 5:
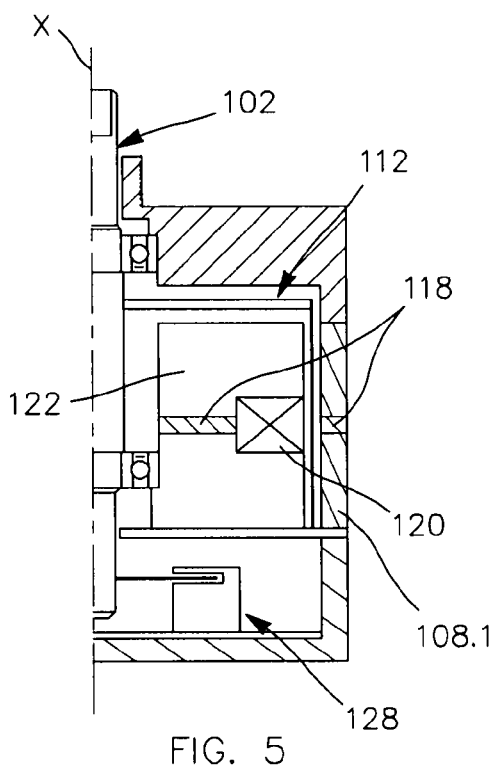

Another variant of the interface in FIG. 3 is shown in FIG. 5, in this case the permanent magnet 118 is located both in the central core 122 and in the sidewall 108.1 of the housing 108.

Figure 6:
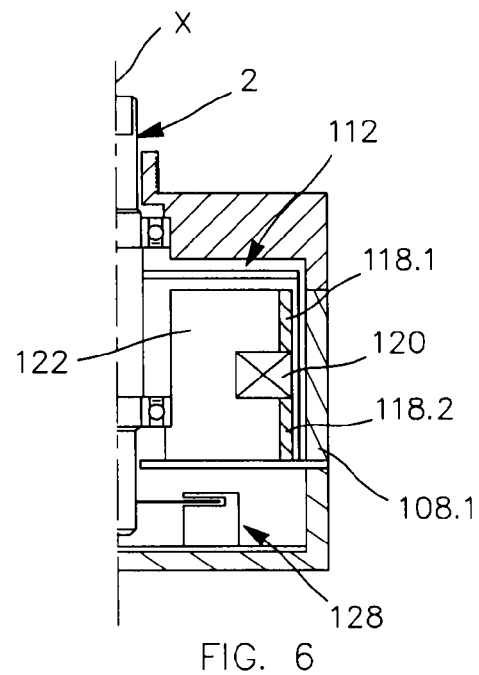

FIG. 6 shows another variant embodiment of the second example embodiment in which the permanent magnet 118 is no longer located inside the core 122, but is now outside the core forming its outside envelope.

In the example shown, the central core 122 is made of a single-piece magnetic material and it comprises an annular groove in which the coil 120 is installed. The coil 120 then projects radially from the radially outer periphery of the core.

The magnet 118 is formed from two cylindrical sleeves 118.1, 118.2, one of which is arranged above the coil and the other below the coil.

It may be possible to place the permanent magnet 118 in the sidewall 108.1 of the housing.

Figure 7:
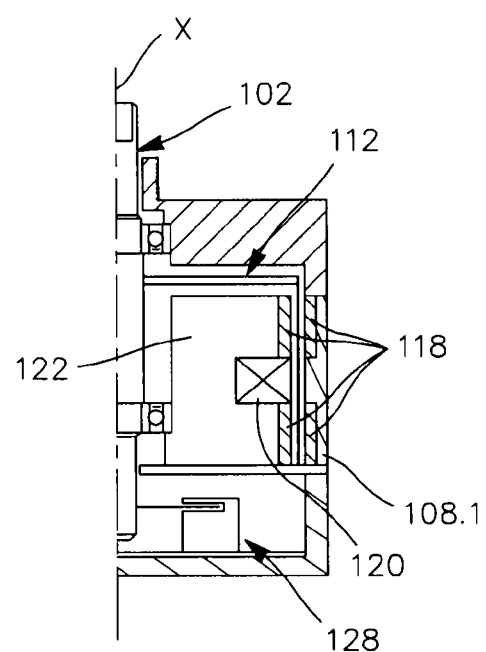

Furthermore, FIG. 7 shows an interface in which the permanent magnets 118 are placed on the outside periphery of the central core 122 and in the sidewall 108.1 of the housing.

The sidewall 108.1 is made from a material capable of conducting a magnetic field.

Interfaces according to the second example embodiment comprising a bell with several concentric skirts similar to that shown in FIG. 2 are included within the scope of the present invention.

Figure 8:
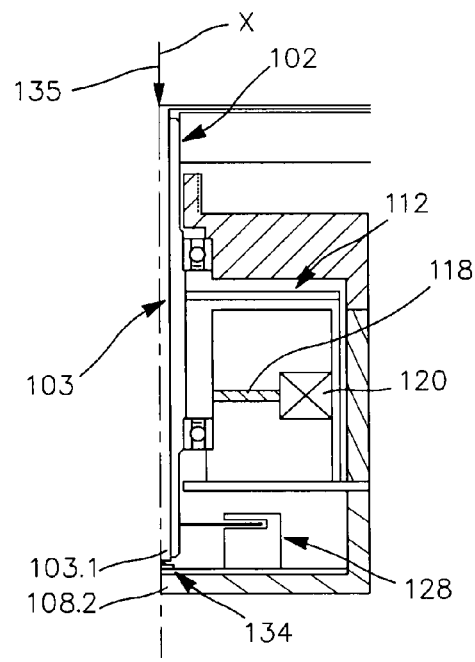
FIG. 8 is a longitudinal sectional view of an interface identical to that in FIG. 3 integrating a longitudinal displacement of the knob. The shaft is hollow and is used to position a click type knob below the shaft.

FIG. 8 shows the interface in FIG. 3 in which a degree of freedom has been added to the knob. The shaft 102 is hollow and a rod 103 is fitted free to move axially in the shaft 102, the rod 103 is fixed in translation to the control knob at a first longitudinal end 103.1 and passes through the shaft 102 from one side to the other. The rod 103 and the shaft 102 are fixed to each other in rotation, rotation of the knob is thus transmitted to the shaft 102 through the rod 103.

An axial displacement sensor is provided to detect axial displacement of the rod 103. For example, this sensor may be an electrical contactor 134 placed on the lower end 108.2 of the housing facing a second longitudinal end 103.1 of the rod 103. When the rod 103 is displaced axially downwards along the direction of the arrow 135, it activates the contactor 134. This electrical contactor is connected to the control and may for example be used in the validation system.

The user can then select a tab in a menu with a single hand by moving a slide by rotating the knob around the X axis, and validating this choice by pushing the knob causing axial displacement of the rod 103 and switching of the contactor 134.

The axial displacement sensor 134 may be of any other type, for example optical or mechanical.

In the example shown, only the rod 103 is displaced along the X axis. However, it would be possible for the entire interface composed of the housing and the knob to move along the X axis. This linear displacement can be included in the knob 1 without disturbing operation of the remainder of the system.

This additional degree of freedom may obviously be applied to all example embodiments.

The second example embodiment is particularly suitable for longitudinal displacement of the knob because its displacement can easily be captured using the bottom head of the interface that is not used.

Obviously, the numbers of coils and/or magnets mentioned in the above description are in no way limitative and they may vary depending on the configuration. The shapes, particularly of the magnets, are also in no way limitative.

Figure 9:
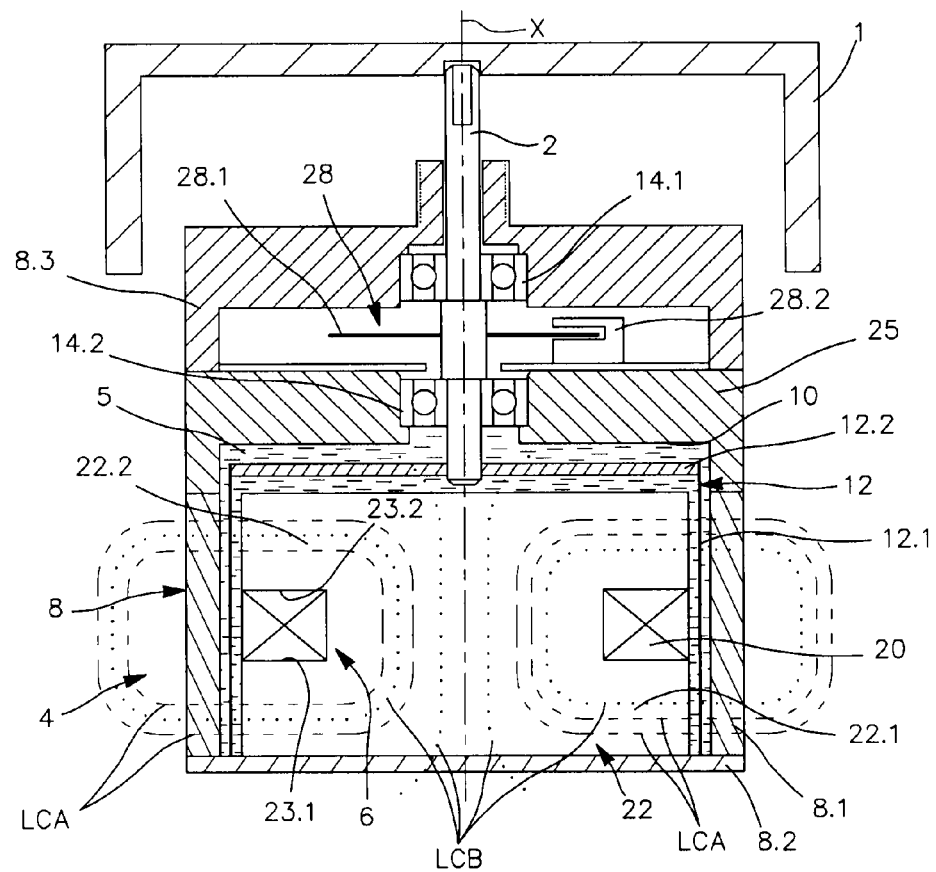
FIG. 9 is a longitudinal sectional view of another example embodiment of an interface according to the present invention, in which a magnetic field only appears when electrical power supply is applied.

FIG. 9 shows another example embodiment of an interface according to the present invention, in which the magnetic field generation system comprises only one means of generating a variable magnetic field 20, for example composed of a coil. Thus, when there is no electrical power supply, there is no magnetic field, which has the advantage of assuring that the force at no load is small. This is applicable to all example embodiments described above.

Figure 10:
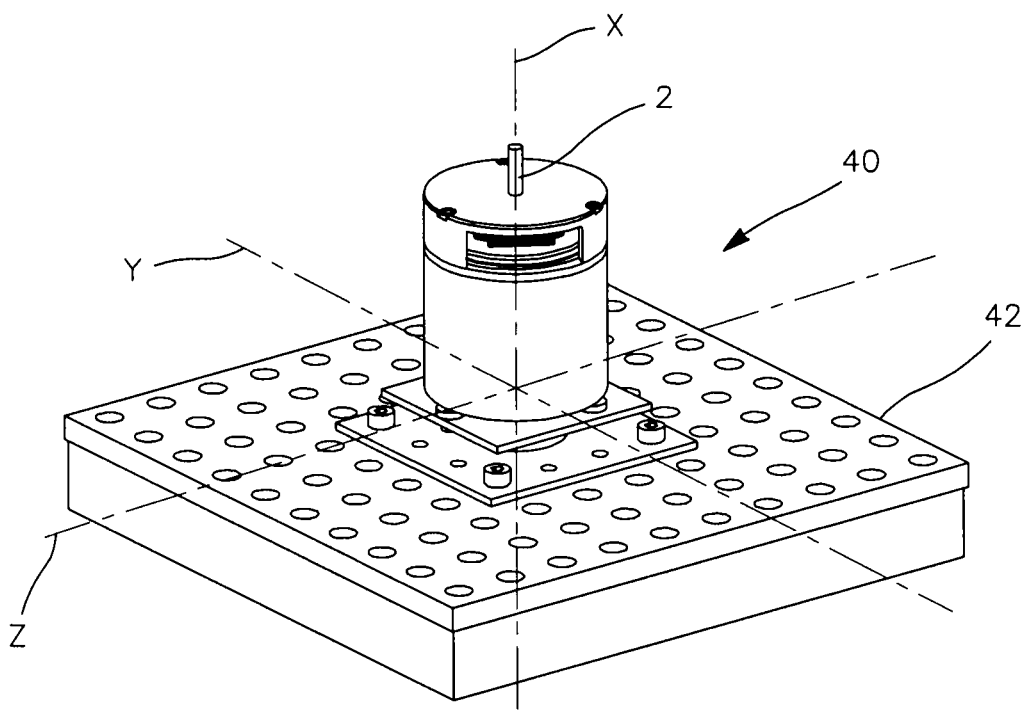
FIGS. 10 and 11 are perspective views of an interface according to the invention associated with a translation and rotation device respectively.

FIG. 10 shows the interface according to the present invention integrated into a device 40 fitted with a chassis 42 onto which it is installed capable of translating along the Y and Z axes, thus forming a "joystick" type control. The device may comprise force feedback systems in these Y and Z directions.

Figure 11:
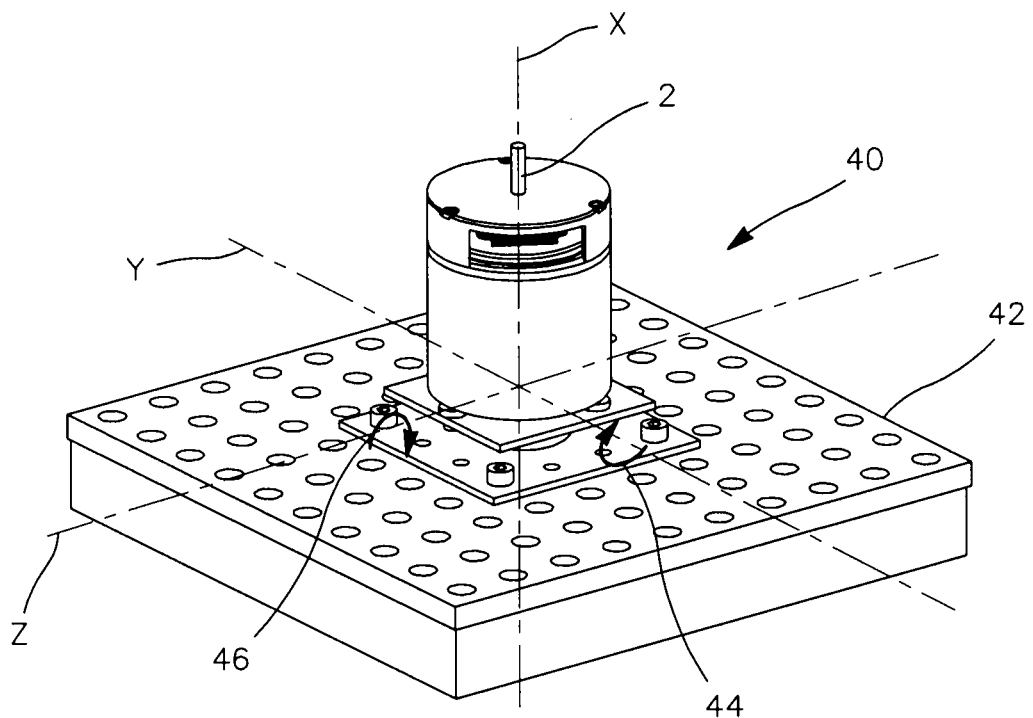

In FIG. 11, the interface is mounted free to pivot about the Y and Z axes along the directions of arrows 44, 46 respectively.

For example, these integrations can be used to add functions to which the knob is already coupled.

A thermal device could also be integrated into the knob to simulate temperature variations, for example using a Peltier cell. Thus, for control of the heating-air conditioning system, the user ordering a temperature drop would feel an impression of cold at his fingers manipulating the knob, and if he orders a temperature rise, he would feel an impression of heat at his fingers manipulating the knob. The information thus transmitted to the user would thus be more intuitive, the user could activate the knob only as a function of what he feels. The driver then no longer needs to look at the screen, thus improving driving safety and comfort.

It would also be possible to provide a device generating vibrations in the knob to provide additional information to the user. For example, if the user receives a telephone call while he is navigating in a menu, he might be informed by a vibration.

It would also be possible to use force or torque sensors to measure the force or torque applied to the knob and to adapt the resistance to a set value of this force or this torque. For example, if a torque is applied to the knob, the resistance to rotation generated by the fluid may be varied by modifying the value of the magnetic field.

Obviously, the control unit can receive information other than the angular position of the rotation shaft, the angular acceleration or velocity of the knob to control the magnetic field to be applied to the fluid, for example information about the pressure applied on it, information concerning the vehicle state (for example the velocity, GPS position, inside and outside temperature, etc.).

The applied feedback may also be independent of external information, for example using a time base. In this case, the haptic feedback does not depend on the actual movement made but on time. For example, sudden haptic changes may be applied at a fixed frequency, regardless of the rotation speed.

It would also be possible to couple external information and a time base to control the magnetic field generation system.

The invention claimed is:

1. A haptic interface comprising:
   an element that interacts with a user;
   a rotation shaft with a longitudinal axis to which the user interaction element is fixed in rotation;
   an element that interacts with a fluid, the fluid interaction element being fixed in rotation to the shaft, the fluid being of magneto-rheological type;
   a system that generates a magnetic field in the fluid; and
   a control unit configured to generate orders to the magnetic field generation system so as to modify the magnetic field;
   the fluid interaction element comprising at least one cylindrical wall with a longitudinal axis, in which through openings are formed and/or on which patterns in relief and/or recessed patterns are formed.

2. A haptic interface according to claim 1, in which the openings and/or relief patterns and/or recessed patterns extend along the longitudinal axis.

3. A haptic interface according to claim 1, in which the fluid interaction element comprises plural concentric sidewalls at a spacing from each other and fixed to a head.

4. A haptic interface according to claim 1, in which the cylindrical wall of the interaction element is made of a non-magnetic material.

5. A haptic interface according to the claim 1, in which the magnetic field generation system is configured to generate a radial magnetic field.

6. A haptic interface according to claim 1, further comprising at least one angular position, angular velocity, and/or angular acceleration sensor for the shaft, the control unit generating orders as a function of information provided by the at least one position, velocity, and/or angular acceleration sensor.

7. A haptic interface according to claim 1, in which the control unit generates orders to the magnetic field generation system at given time intervals.

8. A haptic interface according to claim 1, in which the magnetic field generation system comprises means for generating a variable magnetic field and means for generating a permanent magnetic field.

9. A haptic interface according to claim 8, in which the means for generating a permanent magnetic field comprises at least one permanent magnet.

10. A haptic interface according to claim 8, in which the means for generating a variable magnetic field comprises at least one electromagnetic coil.

11. A haptic interface according to claim 8, in which the means for generating a permanent magnetic field is arranged inside the fluid interaction element, immobile relative to it and in which the means for generating a variable magnetic field is arranged inside the fluid interaction element, immobile relative to it.

12. A haptic interface according to claim 11, in which the means for generating a permanent magnetic field comprises at least one permanent magnet and the means for generating a variable magnetic field comprises at least one electromagnetic coil, the coil surrounding the permanent magnet.

13. A haptic interface according to claim 11, in which the means for generating a permanent magnetic field comprises at least one permanent magnet and the means for generating a variable magnetic field comprises at least one electromagnetic coil, the permanent magnet being formed from at least one sleeve surrounding the coil.

14. A haptic interface according to claim 3, in which the magnetic field generation system comprises means for generating a variable magnetic field and means for generating a permanent magnetic field, and in which the means for generating a permanent magnetic field is arranged between two concentric sidewalls of a bell and is immobile relative to them.

15. A haptic interface according to claim 1, in which the shaft passes through the magnetic field generation system.

16. A haptic interface according to claim 1, further comprising at least one angular position, angular velocity, and/or angular acceleration sensor for the shaft, the control unit generating orders as a function of information provided by the at least one position, velocity and/or angular acceleration sensor, in which the angular position, angular velocity, and/or angular acceleration sensor is provided at one longitudinal end of the shaft and comprises a part fixed to the shaft in rotation and with respect to the shaft.

17. A haptic interface according to claim 16, in which the part fixed to the shaft is an optical wheel and the immobile part is an optical fork.

18. A haptic interface according to claim 1, further comprising a rod passing through the shaft from one side to the other, the rod configured to move longitudinally, and a device for detecting displacement of the rod.

19. A haptic interface according to claim 1, further comprising a thermal device configured to modify temperature of the user interaction element.

20. A haptic interface according to claim 19, in which the thermal device comprises at least one Peltier cell.

21. A haptic interface according to claim 1, further comprising a device capable of vibrating the user interaction element.

22. A haptic assembly comprising:
   a frame, and
   the interface according to claim 1 mounted on this frame, the interface being free to move along the axis of the shaft.

23. A haptic assembly according to claim 22, in which the interface is free to move in translation along at least one direction orthogonal to the longitudinal axis.

24. A haptic assembly according to claim 22, in which the interface is free to rotate about at least one direction orthogonal to the longitudinal axis.

25. A haptic assembly according to claim 23, further comprising force feedback devices to oppose resistance during a movement along at least one axis orthogonal to or about the longitudinal axis.

26. A haptic assembly according to claim 24, further comprising force feedback devices to oppose resistance during a movement along at least one axis orthogonal to or about the longitudinal axis.

* * * * *